United States Patent [19]

Sanchez Velasco

[11] 4,316,689

[45] Feb. 23, 1982

[54] ANCHORAGE SYSTEM OF THE ELEMENTS TO BE SUPPORTED ON THE COMPLETED STRUCTURE

[76] Inventor: Vicente Sanchez Velasco, Canillas, 93 Madrid-2, Spain

[21] Appl. No.: 82,754

[22] Filed: Oct. 9, 1979

[30] Foreign Application Priority Data

Oct. 6, 1978 [ES] Spain ................................. 474.022

[51] Int. Cl.³ ................................................. F16B 13/04
[52] U.S. Cl. .................................... 411/57; 52/711
[58] Field of Search ............. 85/72, 76, 77, 78, 79; 52/159, 160, 704, 698, 711; 411/43, 44–47, 77, 57

[56] References Cited

U.S. PATENT DOCUMENTS

| | | | |
|---|---|---|---|
| 1,311,038 | 7/1919 | Bowman | 85/79 |
| 2,707,897 | 5/1955 | Beeson | 52/704 |
| 3,158,964 | 12/1964 | Haas | 52/704 |
| 3,999,339 | 12/1976 | Sappenfield | 85/72 |
| 4,010,807 | 3/1977 | Fischer | 52/704 |

*Primary Examiner*—John E. Murtagh
*Attorney, Agent, or Firm*—Michael J. Striker

[57] ABSTRACT

An anchoring system is provided for use in building walls. A drill hole is formed in a wall or floor with a radially enlarged portion. A fixing bolt bearing an anchoring sleeve and a threaded piece is inserted into the hole. The anchorage sleeve having radially outwardly extended projections flexes upon insertion into the hole to expand these projections into the enlarged portion and a control element is rotated to move a threaded piece interconnected with the anchoring sleeve into the lower end of the anchoring sleeve. The system provides a more reliable anchor than conventional adhesive bolts or expansion bolts.

9 Claims, 10 Drawing Figures

ANCHORAGE SYSTEM OF THE ELEMENTS TO BE SUPPORTED ON THE COMPLETED STRUCTURE

BACKGROUND OF THE INVENTION

The present invention relates to an anchorage system made up of elements to support installations of all types, and its registration in conformance with the regulatory legislation of the Industrial Property under the terms and conditions established therein.

In the development of large industrial installations, due to their duration and complexity, the construction of the buildings must be carried out simultaneously with the installation design development, due to the fact that, if the construction is delayed until the design is finished, the financial costs would be exorbitant as the contracting of the equipment would have to be made well in advance of the required date and it would be impossible to incorporate the technological advances which could appear during the development of the work as information on the construction of the installation would have to be blocked well in advance.

Due to the above, the construction of the buildings must be performed with necessarily incomplete information of the installation and, therefore, with an incomplete knowledge of the elements needed for anchoring equipment, piping installation, electrical conduits, etc.

Although provisions have been furnished to take into consideration the elements which need to be anchored, there are many cases in which (due to changes in the installation, equipment variations, etc.) no element has been provided for anchoring the equipment and the installations, which becomes especially serious in the case of very heavy equipment or which, for some reason (impacts, seismic accelerations, etc.), transmits heavy loads to the building.

Consequently, during the construction of large industrial installations (and equally in the processes of industrial plant extension or modification), there are many cases in which it is necessary to support heavy loads directly on the completed structure.

At the present, in order to withstand heavy loads on the already completed structure, the anchorage is made by means of bolts which are introduced in drill holes made in the corresponding constructive element, to which they are anchored by means of an adhesive (chemical anchored bolts), or by means of mechanical systems which expand some of the bolt components by pressing laterally against the drill hole walls (expansion bolts).

If both anchoring systems are analyzed, as is done below, it can be seen that neither of them offers total security.

In the chemical anchored bolts, it is impossible to know if the adhesive completely covers the bolt surface and if it makes a good contact with same and with the drill walls. It is also impossible to make any type of inspection. Failures can also be detected in the anchorage due to aging of the adhesive, due to chemical attacks or the existence of foreign bodies in the walls of the drill hole (dust, grease, dampness, etc.).

In the expansion bolts, due to the fact that the anchorage is made pressing laterally against the drill hole walls, long term slippage could appear resulting in loss of all the anchoring capacity throughout this time. This effect is particularly significant in the case of bolts subjected to dynamic loads, where the oscillations produced by the loads give rise to the slippage of the bolts. Furthermore, this type of anchorage is very sensitive to the condition of the drill hole walls and a slippage could be produced if the walls are covered with dust, grease, etc.

From all the above, it can be deduced that the presently existing systems do not afford a complete security and it is necessary to point out that as a consequence of a failure in the anchorage ruptures of the pipe or electrical cables can be produced which, since they are related to the safety of the installation (control systems, fire protection systems, etc.) or due to the type of fluid being transported (acids, fuels, etc.), they can cause total destruction of the plant and loss of human life.

SUMMARY OF THE INVENTION

It is therefore an object of the invention to provide a new anchorage system which will provide a complete degree of security to be carried out, which can be obtained with the system being discussed in the present specification, where the anchorage is made in widened drill holes. Therefore, a complete security in the anchorage is obtained, as described below.

In order to simplify the interpretation of the purpose of this invention, the attached drawings depict a practical way of implementing the system, even if it has to be considered only as an example and therefore is of a purely informative nature, with the respective figures corresponding to each one of the system phases.

DETAILED DESCRIPTION OF THE INVENTION

Figure 1:
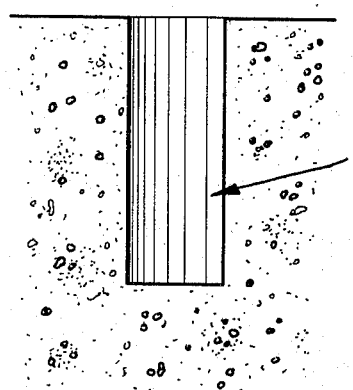
FIG. 1 shows a normal drill hole made in the wall, section view.
Figure 2:
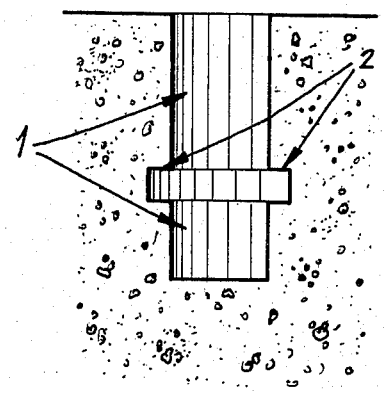
FIG. 2 shows the same drill hole with widening, also in section view.

Among the different meanings of the word "drill hole", the one used here is:

"Narrow hole made by the drill or another similar instrument", and it is understood that "drill holes with widenings" are those in which, at certain depths, there are holes with greater dimensions than the diameter of the original drill hole. These widenings can affect the entire drill hole perimeter or only a part of it and can be made at one or several depths of the drill hole.

Referring to the drawings, in the drill holes (1), the widenings (2) are made with the necessary dimensions and extension to obtain the calculated resistance and to enable erection of the anchorage assembly, and have the necessary capacity, extension and location throughout the length of the drill hole to permit the permanent insertion of projections (10) which, in the form of nails or claws, exist in an anchorage sleeve (8) described below.

Once a conventional drill hole has been made (1), the widenings (2) can be carried out with different procedures among which the following can be cited:

by means of a rotating tool provided with blades which can be spread out, e.g. by rotating around an axis;

by means of percussion systems which, by means of articulated pieces, beat against the drill hole walls;

by means of chemical products which will dissolve or decompose the material in the areas where the drill holes are to be made;

by means of a milling tool on a rotating axis to be introduced throughout the drill hole.

Figures 9, 10:
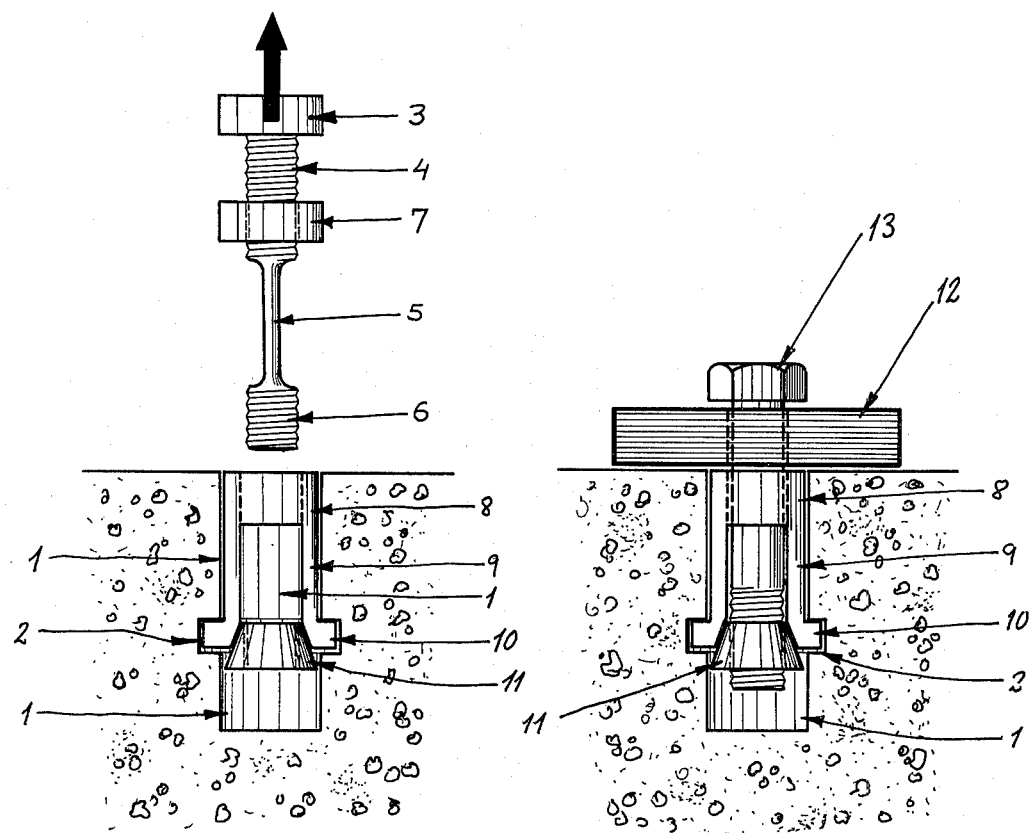
FIG. 9 represents the separation phase of the erection stud after placing and anchoring the anchorage sleeve.
FIG. 10 represents the system once the piece to be anchored has been mounted by means of its anchoring screw.

Once the drill hole and the necessary widenings have been made, the fastening of installations or runs is performed by means of an anchorage assembly essentially comprised of the three following pieces:

a. An interiorally threaded piece (11) with equal or smaller transversal dimensions than the drill hole diameter may be introduced throughout the drill hole.

b. The anchorage sleeve (8) which has some prolongations in the form of clamps (9), radially expansible, is provided with projections (10) in the form of nails and claws, which are able to be inserted in the corresponding widenings (2) of the drill holes (1) made in the building. The inside cavity of the anchorage sleeve (8) is smaller than the transversal dimensions of the interiorally threaded piece so that the former cannot be lost through the latter.

c. A conventional type screw (13) shown in FIG. 10 is installed through the anchorage sleeve, and is anchored to the interiorally threaded piece by means of screwing. The elements to be fastened (12) are anchored by means of this screw.

Figure 3:
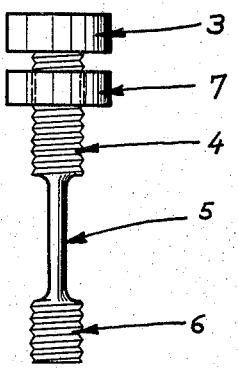
FIG. 3 represents an erection stud with hex head, threaded section, reduced section and threaded terminal section, and having a control element.
Figure 3:
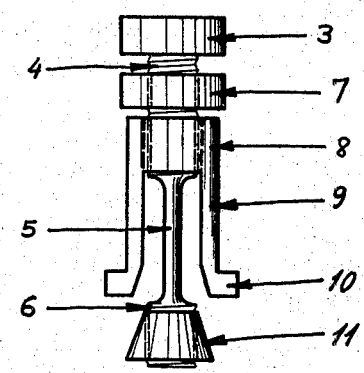
Figure 3:
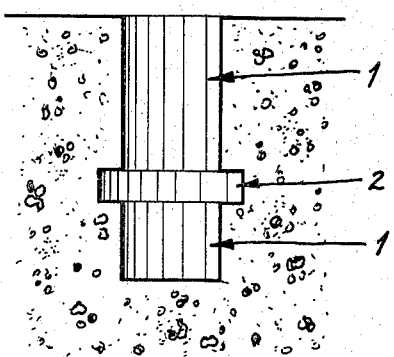
Figure 4:
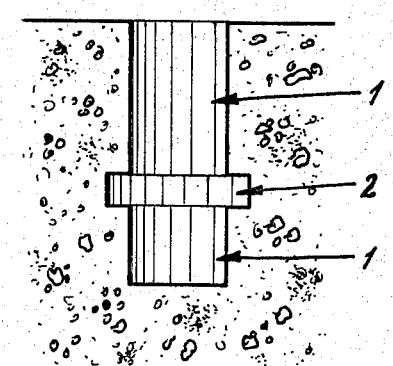
FIG. 4 shows an anchorage sleeve provided with clamps with projections in the form of nails or claws and a threaded piece, with this assembly being located in front of a drill hole with widening.

The installation of the anchorage assembly in the drill hole with widenings made in the building is carried out by means of an erection stud (FIG. 3) with hex head (3) and in which there are three sectors: Two threaded (4 and 6) and one reduced (5) located therebetween.

The threaded sector (6), located at the opposite end of the hex head (3), supports the interiorally threaded piece (11) whilst it is being installed into the drill hole.

Figures 5, 6:
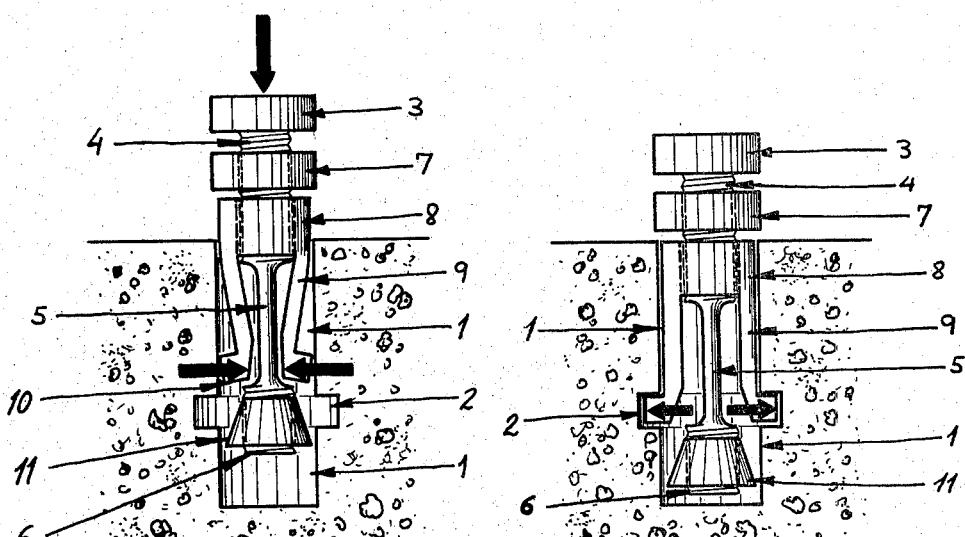
FIG. 5 represents the anchorage sleeve of FIG. 4 assembled on the erection stud of FIG. 3, in the introduction stage of a drill hole according to FIG. 2, with the clamps flattened on the reduced section of the erection stud to enable it to pass through the drill hole.
FIG. 6 shows the phase in which the anchorage sleeve is located in place to proceed with the expansion of the clamps and the introduction of the projections in the widening, by pressure of the threaded piece.
Figures 7, 8:
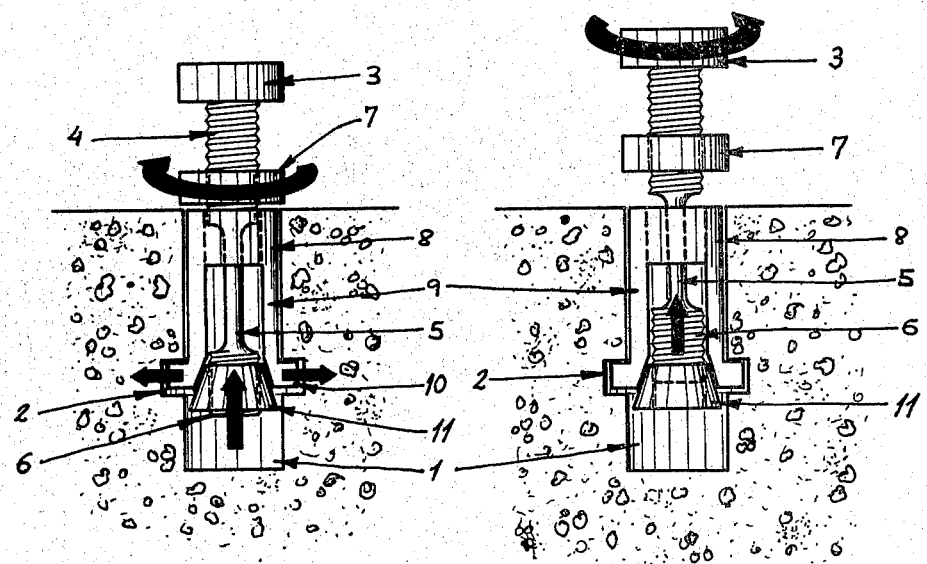
FIG. 7 represents the anchoring phase of the sleeve in the drill hole.
FIG. 8 shows the extraction phase of the erection stud by actuation on the hex head.

The other threaded sector (4), located next to the hex head (3), serves to locate the threaded piece, which is obtained by means of actuating a threaded control element (7) located in this sector, which, on being screwed, leans against the end of the anchorage sleeve (8) and moves the erection stud along the length of the drill hole and, as a result, positions the threaded piece in the anchorage sleeve (FIG. 6).

The reduced section (5) is to allow the flattening of the anchorage assembly clamps (9), in order to permit passing these with their projections (10) along the length of the drill hole (1) during the erection of the sleeve (8).

The installation of the anchorage is carried out by means of the erection stud described above, in the way indicated below and which is also detailed in FIGS. 1 to 10 of the attached drawing, in which the successive operative phases and the respective anchorage system components are shown.

Consequently, the anchorage sleeve (8) is introduced into the erection stud, placing it in such a way that the projections or nails (10) of the clamps (9) remain in front of the reduced section (5) of the former and the threaded piece (11) is placed into the terminal section (6) of the stud opposite the hex head (3).

The clamps (9) are radially moved from the anchorage sleeve, flattening them towards the center of the drill hole so that the clamps with their projections (10) can pass along the length of the drill hole (1) (FIG. 5).

Once the projections (10) of the clamps (9) are in front of the corresponding widenings (2) of the drill hole (1), the mentioned clamps (9) expand in such a way that the projections (10) are introduced into the widenings (2). The expansion of the clamps (9) can be carried out by the elastic recuperation of the deformity produced in the clamps during the introduction of the anchorage sleeve along the length of the drill hole, or due to the actuation of the threaded control element located in the erection stud which, on being screwed, moves the stud along the length of the drill hole with which the threaded piece and the end of the reduced section put a lateral pressure on the clamps, and thus forcing the introduction of their projections in the widenings of the drill hole. The expansion of the clamps can also be accomplished by successive actuation of the two cases described above, in such a way that the elastic recuperation causes a partial introduction of the nails into the widenings and the actuation of the control element produces complete introduction. The threaded piece (11) is maintained in position due to the pressure that this piece puts on clamps (9) of the anchorage sleeve (8).

Once the threaded piece (11) and the anchorage sleeve (8) are installed in their final position, the erection stud is extracted by making it rotate by means of the hex head (3) (FIG. 8), with which it is detached from the threaded piece to which it was screwed.

Thereafter, the screw (13) is installed, by means of which the installations are anchored, screwing it on to the threaded piece (FIG. 10).

In this way, the screw (13) is rigidly anchored since it is screwed to the threaded piece (11), which (due to this piece has greater dimensions than the inside cavity of the anchorage sleeve) cannot be extracted through the sleeve and this, in turn, is firmly anchored in the widenings (2) of the drill hole (1) by means of the nails or claws (10) of the clamps (9).

The transmission of the load to be withstood by the screw is performed as follows: the screw transmits the load to be withstood to the threaded piece, which in turn transmits it to the anchorage sleeve, which is transmitted to the widenings by means of the nails of the clamps. After this, the load is distributed throughout the whole area in which the drill hole has been made. This load transmission can be detailed as follows:

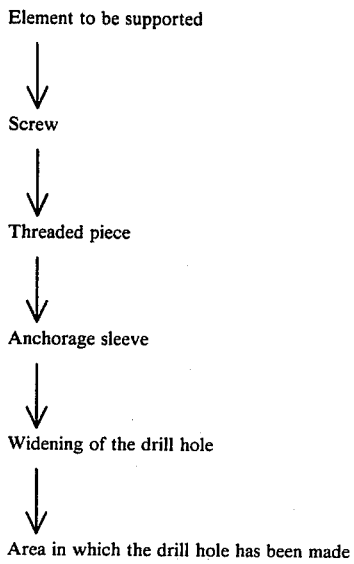

Now that the nature of the invention and its feasibility for industrial application have been sufficiently described, it is only necessary to clarify that variations of materials and procedures could arise due to technical and practical requirements, which will in no case constitute an essential modification of the system specified in the claim.

I claim:

1. In an anchorage system for construction elements such as a wall adapted for insertion into a hole formed in said wall, the combination comprising an anchoring sleeve, an end piece and means for temporarily connecting said anchoring sleeve to said end piece when said anchoring sleeve and said end piece are inserted into said hole, said hole extending into said wall and being formed with a first portion projecting from the surface of the wall, an intermediate second portion further extending into the wall and a third portion forming the bottom of the hole, said second portion having a diameter relatively larger than the diameters of said first and third portions; said anchoring sleeve including a clamping portion terminated with radially outwardly extended projections, whereby when said anchoring sleeve and said end piece are inserted into said hole, said clamping portion is retracted to enable said projections to be placed into said second portion of said hole upon radial expansion of said projections and said end piece clamps said projections in said second portion when said temporarily connecting means are removed from said anchoring sleeve, said connecting means including an elongated stud having a head portion, a first threaded portion, a second threaded portion and a narrowing portion located between said first and second threaded portions and adapted to permit said clamping portion of said anchoring sleeve to be retracted as the same is inserted into said first portion of said hole.

2. The system of claim 1, wherein said end piece has an internal thread and is temporarily supported by said thread on said second threaded portion of said stud.

3. The system of claim 2, wherein said anchoring sleeve has an internal thread to receive said elongated stud therein.

4. The system of claim 3, wherein said end piece has a shape of a truncated cone.

5. The system of claim 4, wherein said clamping portion of said anchoring sleeve has an opening with a tapering portion formed in the area of said projections, said tapering portion conforming to said truncated cone of said end piece.

6. The system of claim 5, wherein said end piece having an outer dimension being relatively larger than the dimension of said tapering portion.

7. The system of claim 6, wherein said temporarily connecting means further comprising a control element mounted on said first threaded portion of said stud for actuating said end piece to move into said tapering portion.

8. The system of claim 7, further including final connecting means to connect an element to be attached to the wall to said anchoring sleeve.

9. The system of claim 8, wherein said final connecting means is a screw inserted into said internal thread of said anchoring sleeve after said elongated stud has been removed.

* * * * *